(12) United States Patent
Toyomi

(10) Patent No.: US 10,207,615 B2
(45) Date of Patent: Feb. 19, 2019

(54) HEADREST

(71) Applicant: TACHI-S CO., LTD., Akishima-shi, Tokyo (JP)

(72) Inventor: Shumpei Toyomi, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 39 days.

(21) Appl. No.: 15/319,645

(22) PCT Filed: Apr. 14, 2015

(86) PCT No.: PCT/JP2015/061411
§ 371 (c)(1),
(2) Date: Dec. 16, 2016

(87) PCT Pub. No.: WO2015/194238
PCT Pub. Date: Dec. 23, 2015

(65) Prior Publication Data
US 2017/0305310 A1 Oct. 26, 2017

(30) Foreign Application Priority Data
Jun. 18, 2014 (JP) ................... 2014-124859

(51) Int. Cl.
*B60N 2/80* (2018.01)
*B60N 2/841* (2018.01)
*B60N 2/60* (2006.01)
*B60N 2/838* (2018.01)
*B60N 2/847* (2018.01)

(52) U.S. Cl.
CPC ........... *B60N 2/841* (2018.02); *B60N 2/6009* (2013.01); *B60N 2/80* (2018.02); *B60N 2/838* (2018.02);
(Continued)

(58) Field of Classification Search
CPC ...... B60N 2/4847; B60N 2/4838; B60N 2/80; B60N 2/806; B60N 2/838; B60N 2/841;
(Continued)

(56) References Cited

U.S. PATENT DOCUMENTS 1,037,631 A * 9/1912 Jones .................. F16H 59/0213
180/90.6
3,748,923 A * 7/1973 Babbitt, Jr. ............. F16J 15/00
277/506
(Continued)

FOREIGN PATENT DOCUMENTS

DE 3102258 A1 * 10/1982 ......... F16H 59/0213
DE 102005024544 B3 * 6/2006 .......... B60N 2/4838
(Continued)

OTHER PUBLICATIONS

Extended European Search Report correspondirag to Application No. 15809188.4-1754/3159210 PCT/JP2015061411; dated Jun. 28, 2017.
(Continued)

*Primary Examiner* — Ryan D Kwiecinski
(74) *Attorney, Agent, or Firm* — Cantor Colburn LLP

(57) ABSTRACT

A headrest includes a stay having left and right legs; a headrest main body attached to the stay and able to rotate in a front-rear direction; a pair of elongated holes made in a bottom surface of the headrest main body and a pair of closing members arranged on the bottom surface of the headrest main body, covering the elongated holes, wherein each closing member includes a main plate and a sub-plate, the main plate has an insertion hole guiding one leg of the stay and moves in the front-rear direction as the main plate is rotated, and the sub-plate is provided, overlapping the main plate, and is able to move as the main plate moves; the main plate and the sub-plate may move as the headrest main body is rotated, while covering the elongated hole made in the bottom surface of the headrest main body.

5 Claims, 9 Drawing Sheets

(52) U.S. Cl.
CPC ........ *B60N 2/847* (2018.02); *B60N 2002/899* (2018.02)

(58) Field of Classification Search
CPC .. B60N 2/847; B60N 2/865; B60N 2002/899; Y10T 74/2093; F16H 59/0213; G05G 25/04
See application file for complete search history.

(56) References Cited

U.S. PATENT DOCUMENTS

| | | | | |
|---|---|---|---|---|
| 6,149,233 | A | * 11/2000 | Takei | B60N 2/70 297/220 |
| 9,463,724 | B2 | * 10/2016 | Sunaga | B60N 2/4838 |
| 2005/0189160 | A1 | * 9/2005 | Oana | B60K 20/04 180/336 |
| 2014/0339875 | A1 | 11/2014 | Sunaga et al. | |

FOREIGN PATENT DOCUMENTS

| | | | | |
|---|---|---|---|---|
| DE | 102007024351 A1 | * | 11/2008 | ............. B60K 20/02 |
| JP | 59220420 A | * | 12/1984 | ......... F16H 59/0213 |
| JP | 61239313 A | * | 10/1986 | ............. G05G 25/04 |
| JP | 171532 U | | 5/1989 | |
| JP | 07039431 A | | 2/1995 | |
| JP | 11263158 A | | 9/1999 | |
| JP | 2007167379 A | | 7/2007 | |
| JP | 5557946 B1 | * | 7/2014 | ............... B60N 2/58 |
| JP | 5557946 B1 | | 7/2014 | |

OTHER PUBLICATIONS

International Search Report corresponding to Application No. PCT/JP2015/061411; dated Jun. 30, 2015.

* cited by examiner

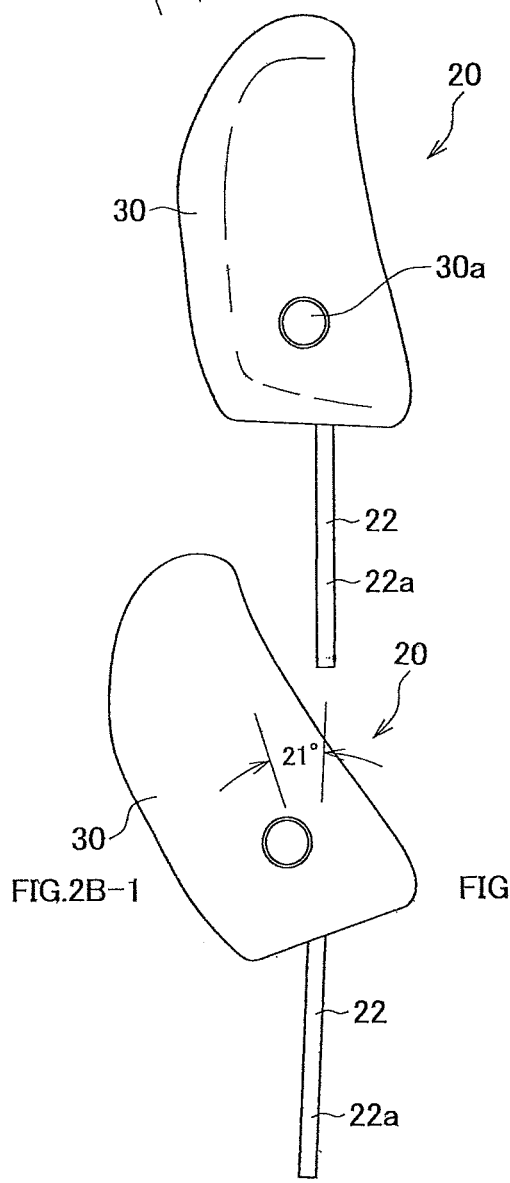
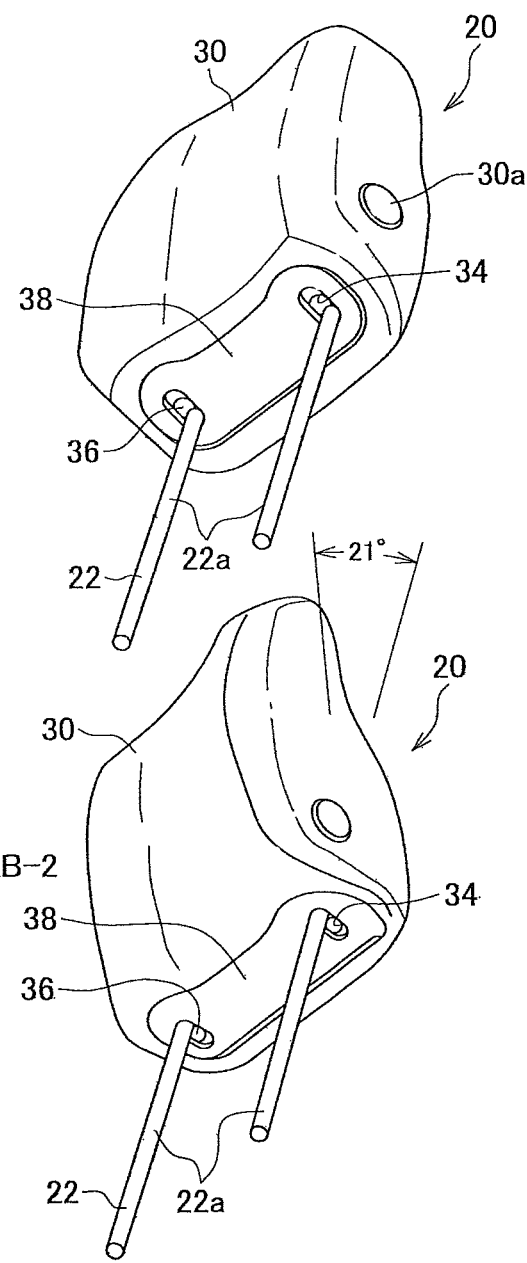

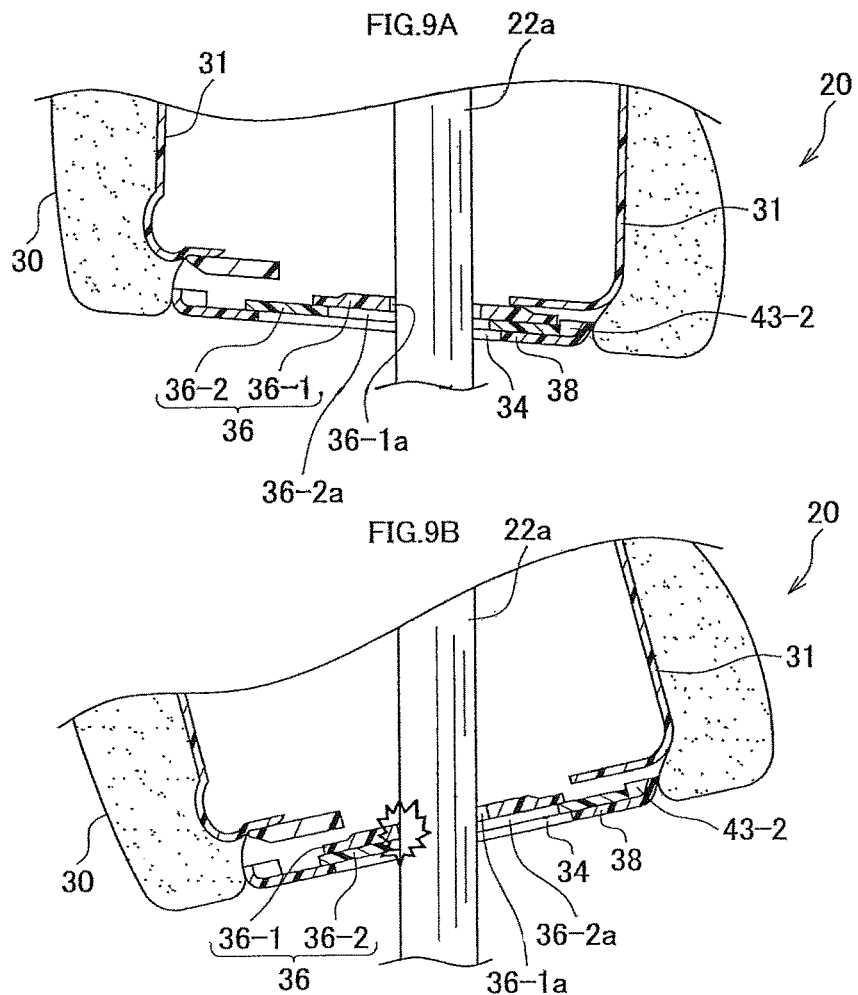
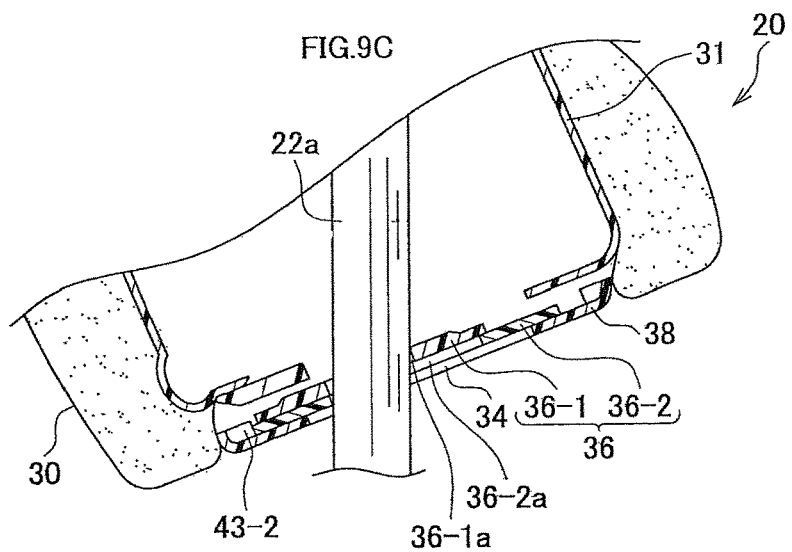

HEADREST

CROSS REFERENCE TO RELATED APPLICATIONS

This is the U.S. national stage of application No. PCT/JP2015/061411 dated Apr. 14, 2015. Priority under 35 U.S.C. § 119(a) and 35 U.S.C. § 365(b) is claimed from Japanese Patent Application No. 2014-124859, filed Jun. 18, 2014, the entire contents of which are incorporated herein by reference.

BACKGROUND OF THE INVENTION

1. Field of the Invention

This invention relates to a headrest to be provided on, for example, the seatback of the vehicle seat.

2. Description of the Related Art

Broadly known as a vehicle seat is a seat comprising a seat cushion, a seatback coupled at lower edge to the rear part of the seat cushion, and a headrest held at the upper edge of the seatback.

The headrest comprises a stay and a headrest main body. The stay is held to the upper edge of the seatback, and the headrest main body is configured to support the occupant's head resiliently and attached on the stay. The headrest main body is formed by covering a pad made of, for example, urethane foam, with a trim cover (surface sheet).

Usually, the stay is shaped like an inverted Letter U and made integral, composed of a pair of legs (left and right legs) and a middle part (coupling part) coupling the left and right legs at upper end. The middle part of the stay, for example, extends into the headrest main body and is housed therein. The headrest main body can rotate forward and backward around the middle part of the stay. The headrest main body, namely headrest, may rotate forward, to reduce the gap between the occupant's head and the front of the headrest main body. The headrest of this rotatable type is broadly used together with seats such as vehicle seat.

In the rotatable-type headrest, i.e., headrest that can rotate forward and backward, a pair of elongated holes (left and right elongated holes) are made in the bottom surface (lower surface) of the headrest main body, extend in the front-rear direction, and are spaced apart from each other in the left-right direction. The left and right legs of the stay extend through the left and right elongated holes made in the bottom surface of the headrest main body, respectively. The headrest main body can therefore rotate in the front-rear direction until the front and rear ends of each elongated hole abut on the associated leg of the stay. Hence, the headrest main body, i.e., headrest, can be rotated forward. The headrest is locked at the position where it is rotated forward. When it is unlocked, the headrest is rotated back to the initial position (rear position) by virtue of the spring force of, for example, a return spring.

The stay has been formed, as in most cases, by bending a rod having a circular cross section in the form of an inverted Letter U. The elongated holes made in the bottom surface of the headrest main body are longer than the diameter of the legs of the stay, and allow the headrest main body to rotate. Two parts of each elongated hole, through which the leg of the stay does not extend, therefore remain as openings (spaces or gaps) at the front and back of the leg of the stay, respectively. Through these gaps the interior of the headrest main body is seen from outside, impairing the outer appearance of the headrest. Further, when the headrest is rotated forward or unlocked back to the initial position by virtue of the force of the return spring, it may pinch the occupant's finger in the gaps, namely in the elongated holes.

In view of this, it is proposed that a pair of plate-shaped closing members, i.e., left and right closing members, should cover the elongated holes made in the bottom surface of the headrest main body, respectively, and should move (slide) in the front-rear direction on the bottom surface of the headrest main body as the headrest main body is rotated. The closing members move, while covering the elongated holes even if the headrest main body rotates in the front-rear direction, changing the position of the stay with respect to the elongated holes. Therefore, the elongated holes are closed sufficiently, leaving no gaps.

JP 2007-167379A, for example, discloses a configuration in which a pair of insertion holes (left and right holes) are made in the substantially center parts of a pair of closing members (left and right closing members), the legs of the stay extend through the insertion holes, and the left and right closing members move in the front-rear direction, while closing the left and right elongated holes, respectively. A cam surface is provided on the outer circumference of each closing member, and a pair of engagement pins (left and right pins) project from the bottom surface of the headrest main body. The right engagement pin contacts the cam surface of the right closing member, and the left engagement pin contacts the cam surface of the left closing member.

A supporting member is provided on the inner upper surface of the headrest main body. The middle part of the stay is supported by the supporting member, which can rotate. The headrest main body is therefore supported by the middle part of the stay, and can rotate in the front-rear direction around the middle part of the stay together with the supporting member.

If the headrest main body is rotated in the front-rear direction around the middle part of the stay, the closing members rotate around the legs of the stay, while keeping the cam surface in contact with the engaging pin of the bottom surface of the headrest main body. As the closing members so rotate, they move in the front-rear direction until the front and rear ends of the elongated hole abut on the legs of the stay. Hence, no gaps (spaces) exist in the elongated holes made in the bottom surface of the headrest main body.

Besides the configuration using the combination of a cam surface and engagement pins, JP 2007-167379A discloses a configuration in which a pinion and a lack are utilized. In this configuration, too, the closing members move in the front-rear direction, while rotating around the legs of the stay and covering the elongated holes, until the front and rear ends of the elongated holes abut on the legs of the stay.

JP 07-039431A describes a configuration in which one closing member moves without rotating as the headrest main body moves.

That is, a box-shaped housing is arranged on the upper part of the front of the seatback and supports, from below, the pair of legs (left and right legs) of the stay of the headrest. The housing has a surface gently inclining from the front to the upper surface, and has in the inclining surface a pair of elongated holes (left and right vertical elongated holes) extending in the up-down direction. The left and right legs of the stay of the headrest extend through the elongated holes made in the front of the housing, are secured to the housing and can be rotated forward.

The closing member is provided on the front of the housing and can move in the left-right direction (horizontal direction). The closing member has a pair of elongated holes (left and right elongated holes) that incline to the vertical elongated holes made in the front of the housing. The left and right legs of the stay extend through the vertical elongated holes made in the front of the housing and the inclining elongated holes of the closing member, respectively, at the positions where the vertical elongated holes intersect with the inclining elongated holes of the closing member.

The vertical elongated holes of the housing are covered and closed with the closing member provided on the front of the housing, except for the parts through which the legs of the stay extend and intersect with the inclining elongated holes of the closing member. Further, the inclining elongated holes of the closing member are covered and closed with the housing located at the back of the closing member. Therefore, no gaps (spaces) exist in the vertical elongated holes of the housing or in the inclining elongated holes of the closing member.

The headrest main body is fastened to the center part of the stay and made integral with the stay. Hence, the legs of the stay move down in the vertical elongated holes made in the front of the housing if the headrest main body is rotated forward. The legs of the stay extend not only through the vertical elongated holes made in the front of the housing, but also through the inclining elongated holes made in the closing member. The legs of the stay moving down in the vertical elongated holes made in the front of the housing move down also in the inclining elongated holes made in the closing member. The legs of the stay therefore push the closing member, moving (sliding) the closing member in the left-right direction on the front of the housing.

The positions, where the two elongated holes (i.e., vertical elongated hole and inclining elongated hole) through which the legs of the stay extend and intersect with each other, change as the legs of the stay push the closing member, moving the closing member in the left-right direction. However, the vertical elongated holes of the housing are covered and closed with the closing member provided on the front of the housing, except for those parts through which the legs of the stay extend. Hence, no gaps exist in the vertical elongated holes made in the front of the housing or the inclining elongated holes made in the closing member even if the headrest rotates forward and the legs of the stay therefore move down in the vertical elongated holes.

Patent Literature 1: Japanese Patent unexamined Publication JP 2007-167379A

Patent Literature 2: Japanese Patent unexamined Publication JP 07-039431A

In the configuration disclosed in JP 2007-167379A, the elongated holes made in the bottom surface of the headrest main body remain covered with the closing members that move along the elongated holes. No gaps therefore exist in the elongated holes, and the interior of the headrest main body is not seen from outside through openings. This prevents the outer appearance of the headrest from being impaired. Moreover, since the elongated holes remain covered all the time, the occupant's fingers would not be pinched in the elongated holes when the headrest is rotated forward or rotated back to the initial position.

As described above, the closing members move along the elongated holes extending in the front-rear direction, while rotating around the legs of the stay. Spaces for allowing the closing members to rotate must, therefore, be provided at the bottom surface of the headrest main body in the direction at right angles to the elongated holes (i.e., left-right direction), in addition to the spaces extending in the moving direction of the closing members. Consequently, the arrangement of members in the direction at right angles to the elongated holes (i.e., left-right reaction) is limited, restricting the freedom of design.

In the configuration disclosed in JP 07-039431A, no gaps (spaces) will exist in the vertical elongated holes of the housing or in the inclining elongated holes of the closing member even if the headrest main body is rotated forward and the legs of the stay therefore move down in the vertical elongated holes. To allow the left and right legs of the stay to move in the up-down direction, however, two grooves are made in the trim cover at the upper-front part of the seatback, in alignment with the vertical elongated holes of the housing. Consequently, the two grooves made in the trim cover are seen from outside, inevitably impairing the outer appearance of the seat.

Further, the scarf or jacket the occupant wears may be caught in the grooves cut in the trim cover. While the scarf, for example, are being caught in the grooves, the left and right legs of the stay may move down in the left and right vertical elongated holes made in the front of the housing, and the closing member may therefore move in the left-right direction on the front of the housing. In this case, the scarf will probably be pulled into the vertical elongated holes made in the front of the housing and also into the inclining elongated holes made in the closing member.

An object of this invention is to provide a headrest, in which the closing members move, covering the elongated holes and preventing scarf or the like from being caught in the elongated holes, and which is not restricted in design freedom.

SUMMARY OF THE INVENTION

In this invention, the elongated holes are made in the bottom surface of the headrest main body, the closing members move in the direction the elongated holes extend, namely in the front-rear direction, without rotating on the bottom surface of the headrest main body. The closing members include a main plate and a sub-plate each. The main plate may move in the front-rear direction in unison with the rotation of the headrest main body. The sub-plate can be moved together with the main plate. The main plate and the sub-plate move in the front-rear direction, while closing the elongated hole.

That is, according to one aspect of the embodiment, a headrest includes a stay having left and right legs; a headrest main body attached to the stay and able to rotate in a front-rear direction; a pair of elongated holes made in a bottom surface of the headrest main body, extending in the front-rear direction and spaced apart in a left-right direction and guiding the legs of the stay, thereby allowing the headrest main body to rotate in the front-rear direction; and a pair of closing members arranged on the bottom surface of the headrest main body, covering the elongated holes, respectively, and able to move on the bottom surface of the headrest main body in the front-rear direction, wherein each closing member includes a main plate and a sub-plate, the main plate has an insertion hole guiding one leg of the stay and moves in the front-rear direction as the main plate is rotated, and the sub-plate is provided, overlapping the main plate, and is able to move as the main plate moves; each leg of the stay extends in the up-down direction through not only the elongated hole made in the bottom surface of the headrest main body, but also the insertion hole of the main plate; and the main plate and the sub-plate move in the front-rear direction on the bottom surface of the headrest main body as the headrest main body is rotated, while covering the elongated hole made in the bottom surface of the headrest main body.

In the invention, the left and right closing members (pair of closing members) provided in pair move in the front-rear direction without rotating on the bottom surface of the headrest main body. Therefore, spaces for allowing the closing members to rotate need not be made in the bottom surface of the headrest main body, in the direction intersecting at right angles to the left and right elongated holes (pair of elongated holes) made in the bottom surface of the headrest main body. Therefore, the arrangement of members is not limited in the direction intersecting at right angles to the left and right elongated holes, and the freedom of design is not restricted.

Since the closing members close the elongated holes made in the bottom surface of the headrest main body, the occupant never has his fingers pinched in the elongated holes. For the same reason, the scarf or jacket the occupant wears would not be taken into the elongated holes.

BRIEF DESCRIPTION OF THE DRAWINGS

FIG. 2A-1 is a side view of the headrest main body set in the initial position (at rear position, rotated forward by 0°);

FIG. 2A-2 is a perspective view of the headrest main body set in the initial position (at rear position, rotated forward by 0°), as seen from below;

FIG. 2B-1 is a side view of the headrest main body set in the maximum rotated position (rotated forward by 21°);

FIG. 2B-2 is a perspective view of the headrest main body set in the maximum rotated position (rotated forward by 21°), as seen from below;

FIG. 6A-1 is a plan view of the main plate;

FIG. 6A-2 is a plan view of the sub-plate;

FIG. 6A-3 is a plan view of the right half of the under-cover;

FIG. 6B-1 is a sectional view of the main plate, taken along line 6B-1-6B-1 shown in FIG. 6A-1;

FIG. 6B-2 is a sectional view of the sub-plate, taken along line 6B-2-6B-2 shown in FIG. 6A-2;

FIG. 6B-3 is a sectional view of the under-cover, taken along line 6B-3-6B-3 shown in FIG. 6A-3;

FIG. 9A is a partly sectional, vertical view of the headrest main body set in the initial position (rotated forward by 0°);

FIG. 9B is a partly sectional, vertical view corresponding to FIG. 7B, showing the headrest main body set in the first intermediate rotated position (rotated forward by 7°); and FIG. 9C is a partly sectional, vertical view of the headrest main body set in the maximum rotated position (rotated forward by 21°).

DETAILED DESCRIPTION OF THE INVENTION

A headrest comprises a stay having left and right legs; a headrest main body attached to the stay and able to rotate in a front-rear direction; a pair of elongated holes made in a bottom surface of the headrest main body, extending in the front-rear direction and spaced apart in a left-right direction and guiding the legs of the stay, thereby allowing the headrest main body to rotate in the front-rear direction; and a pair of closing members arranged on the bottom surface of the headrest main body, covering the elongated holes, respectively, and able to move on the bottom surface of the headrest main body in the front-rear direction, wherein each closing member includes a main plate and a sub-plate, the main plate has an insertion hole guiding one leg of the stay and moves in the front-rear direction as the main plate is rotated, and the sub-plate is provided, overlapping the main plate, and is able to move as the main plate moves; each leg of the stay extends in the up-down direction through not only the elongated hole made in the bottom surface of the headrest main body, but also the insertion hole of the main plate; and the main plate and the sub-plate move in the front-rear direction on the bottom surface of the headrest main body as the headrest main body is rotated, while covering the elongated hole made in the bottom surface of the headrest main body.

Embodiment

Embodiments of this invention will be described in detail, with reference to the accompanying drawings.

Figure 1:
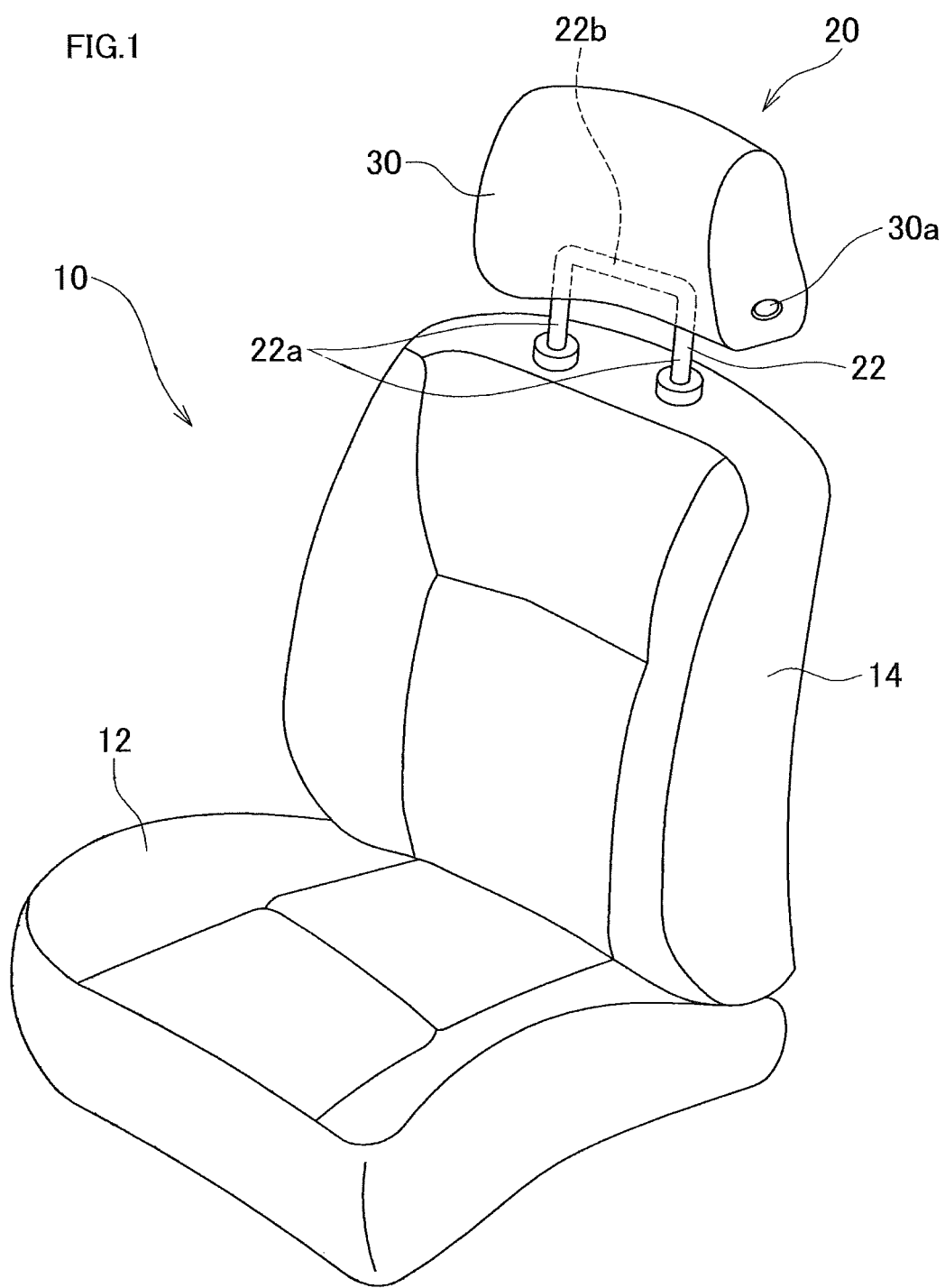
FIG. 1 is a perspective view showing a vehicle seat comprising a headrest according to an embodiment of the invention, which is held at the upper edge of the seatback.

FIG. 1 is a perspective view showing a vehicle seat comprising a headrest according to an embodiment of the invention, which is held at the upper edge of the seatback; FIG. 2A-1 is a side view of the headrest main body set in the initial position (at rear position, rotated forward by 0°); FIG. 2A-2 is a perspective view of the headrest main body set in the initial position (at rear position, rotated forward by 0°), as seen from below; FIG. 2B-1 is a side view of the headrest main body set in the maximum rotated position (rotated forward by 21°) and FIG. 2B-2 is a perspective view of the headrest main body set in the maximum rotated position (rotated forward by 21°), as seen from below;

In the drawings, arrows Fr and Rr indicate the forward and rearward directions, with respect to the driver seated in the driver seat.

As shown in FIG. 1, the seat 10 comprises a seat cushion 12 and a seatback 14 coupled, at lower edge, to the rear edge of the seat cushion 12. A headrest 20 according to one embodiment of this invention is held at the upper edge of the seatback. The seat 10 is, for example, a vehicle seat that may be arranged in a vehicle in which the seatback has its lower edge coupled to the rear edge of the seat cushion and can be inclined. The seat 10 is of the known type and does not essential to this invention, and will not be described in detail.

The headrest 20 comprises a stay 22 and a headrest main body 30. The stay 22 is fastened to the upper edge of the seatback. The headrest main body 30 is attached to the stay and designed to support the occupant's head resiliently.

The stay 22 is shaped like an inverted Letter U as seen from front, and includes a pair of legs (pillars) 22a and a middle part (coupling part) 22b coupling the left and right legs at upper end. The stay has been made by bending, for example, a rod (steel pipe) having a circular cross section.

The headrest main body 30 includes, for example, a frame, a pad, and a trim cover. The frame is composed of a front half and a rear half. The pad is made of foam such as urethane foam, and wraps up the frame. The trim cover covers the pad. The frame defines a space in it. In the space, the middle part 22b of the stay is set by a bracket and holds the headrest main body 30, allowing the same to rotate. Thus, the headrest main body 30 is a movable component, and the stay 22 is a non-movable (stationary) component.

The stay 22 need not be shaped like an inverted Letter U as seen from front. It may have any other shape so long as it has a pair of legs (left and right legs) extending from the bottom of the headrest and holds the headrest main body 30, allowing the same to rotate.

The headrest main body 30 can be rotated forward around the middle part 22b of the stay, from the initial position (i.e., rear position). For example, the headrest main body may be rotated forward in three steps from the initial position, each time by 7° (finally by 21°). At each rotated position, the headrest main body is locked by a lock mechanism.

Figure 3A:
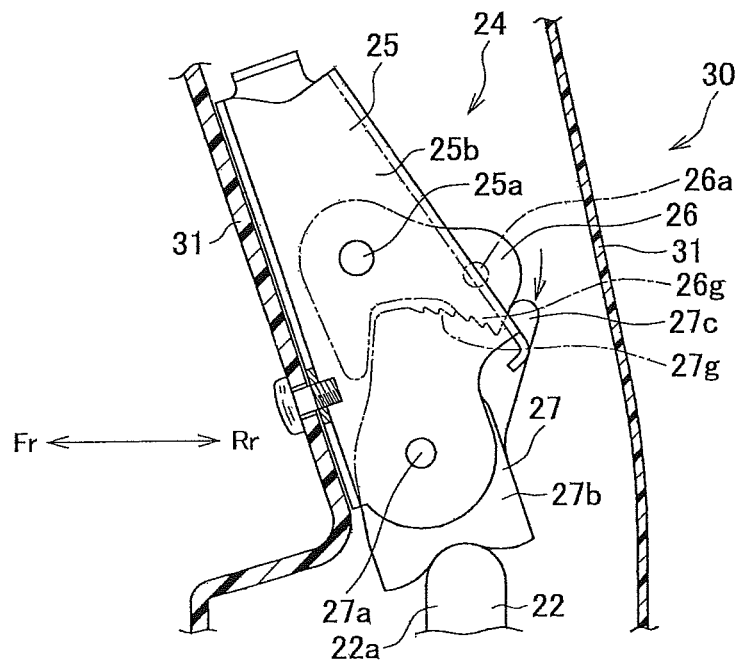
FIG. 3A is a partly sectional, vertical view showing the interior of the headrest main body set in the initial position (rotated forward by 0°)
Figure 3B:
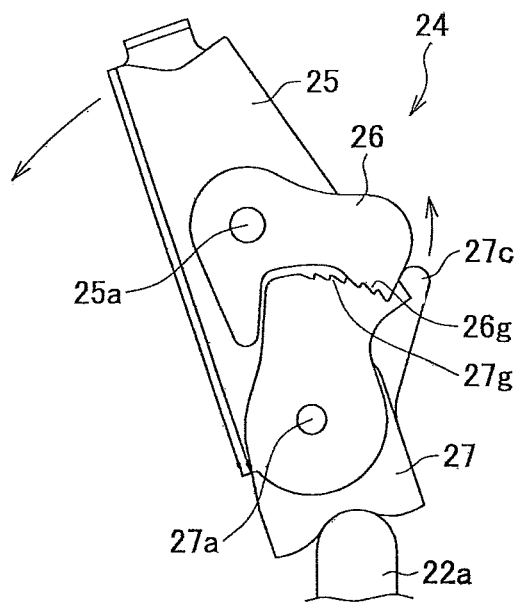
FIG. 3B is a side view of the headrest main body set in the initial position (rotated forward by 0°), not showing the frame illustrated in FIG. 3A.
Figure 3C:
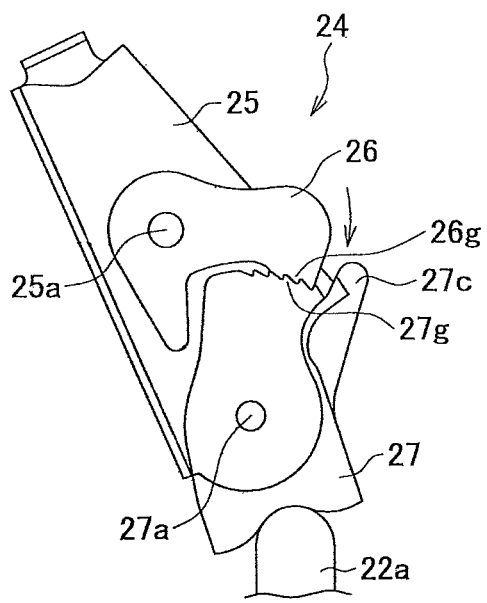
FIG. 3C is a side view of the headrest main body set in the first intermediate rotated position (rotated forward by 7°), not showing the frame illustrated in FIG. 3A.

FIG. 3A is a partly sectional, vertical view showing the interior of the headrest main body set in the initial position (rotated forward by 0°); FIG. 3B is a side view of the headrest main body set in the initial position (rotated forward by 0°), not showing the frame illustrated in FIG. 3A and FIG. 3C is a side view of the headrest main body set in the first intermediate rotated position (rotated forward by 7°), not showing the frame illustrated in FIG. 3A.

As shown in FIG. 3A, the lock mechanism 24 has a bracket 25, a latch 26, and a lock plate 27. The bracket 25 has left and right flanges and is shaped like an inverted Letter U as seen in the plane. The left and right flanges are bolted to a front base (frame) 31. A pin (axle) 25a extends between left and right side walls 27b of the bracket. The latch 26 can rotate in the front-rear direction around the pin 25a, while being supported by the bracket 25.

The lock plate 27 is shaped like U as seen in the plane. Left and right side walls 27b of the lock plate are welded at lower end to the middle part 22b of the stay. A pin (axle) 27a extends between the left and right walls 27b. The bracket 25 supports the lock plate 27, allowing the lock plate to rotate in the front-rear direction around the pin (axle).

The latch 26 is positioned above the lock plate 27. Its distal end is a lever having a gear 26g. A gear 27g is formed on the upper edge of the lock plate 27 and opposes the gear 26g of the latch 26. A torsion spring (not shown) is wound around the pin 25a. The spring force acting in the clockwise direction is applied to the latch 26, keeping the gear 26g formed on the latch in mesh with the gear 27g of the lock plate.

In the embodiment, the headrest main body 30 may be rotated forward in three steps from the initial position, each time by 7° (finally by 21°). Three teeth are formed on distal end of the latch 26 and five teeth are formed on the upper edge of the lock plate 27. These teeth are arranged at angular pitch of 7°. The gear 26g of the latch 26 can therefore mesh with the gear 27g of the lock plate 27, at four positions including the initial position.

Figure 4A:
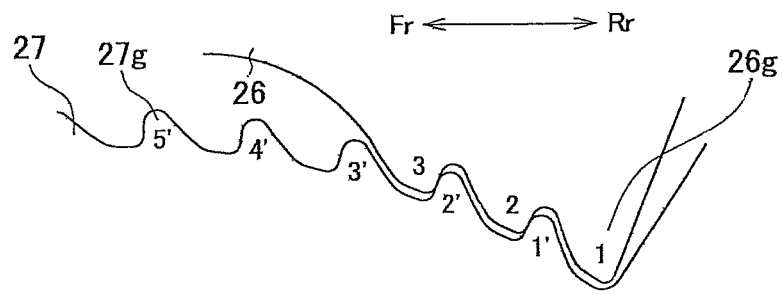
FIG. 4A is a schematic plan view of the gear of the lock plate and the latch meshed with the gear when the headrest main body is set in the initial position (rotated forward by 0°)
Figure 4B:
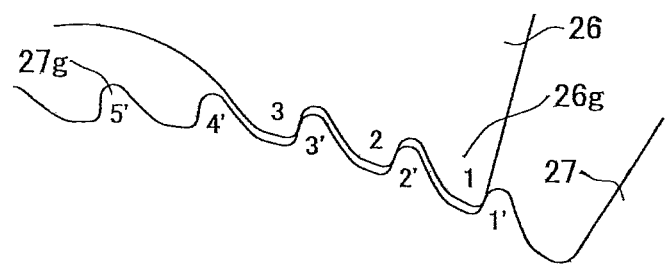
FIG. 4B is a schematic plan view of the gear of the lock plate and the latch meshed with the gear when the headrest main body is set in the first intermediate rotated position (rotated forward by 7°)
Figure 4C:
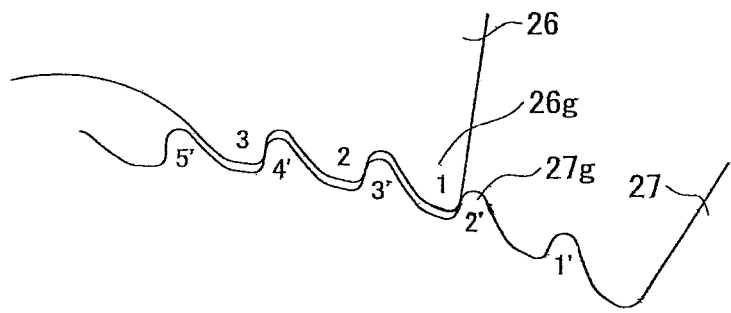
FIG. 4C is a schematic plan view of the gear of the lock plate and the latch meshed with the gear when the headrest main body is set in the second intermediate rotated position (rotated forward by 14°)
Figure 4D:
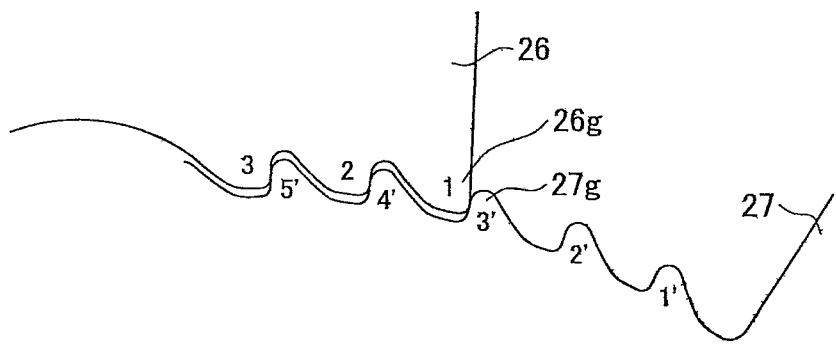
FIG. 4D is a schematic plan view of the gear of the lock plate and the latch meshed with the gear when the headrest main body is set in the maximum rotated position (rotated forward by 21°)

FIG. 4A is a schematic plan view of the gear of the lock plate and the latch meshed with the gear when the headrest main body is set in the initial position (rotated forward by 0°); FIG. 4B is a schematic plan view of the gear of the lock plate and the latch meshed with the gear when the headrest main body is set in the first intermediate rotated position (rotated forward by 7°); FIG. 4C is a schematic plan view of the gear of the lock plate and the latch meshed with the gear when the headrest main body is set in the second intermediate rotated position (rotated forward by 14°) and FIG. 4D is a schematic plan view of the gear of the lock plate and the latch meshed with the gear when the headrest main body is set in the maximum rotated position (rotated forward by 21°).

For convenience of explanation, the three teeth of the latch gear 26g shall be called teeth 1 to 3, from right to left, and the five teeth of lock plate gear 27g shall be called teeth 1' to 5', from right to left as specified in FIGS. 4A to 4D.

When the headrest main body 30 is set in the initial position (i.e., initial position of the headrest 20), the second teeth 2 and third teeth 3 of the latch 26 having three teeth mesh with the first teeth 1' and second teeth 2' of the lock plate 27 having five teeth, respectively as shown in FIG. 4A.

Needless to say, the gear 26g of the latch and the gear 27g of the lock plate are so shaped that the gear 26g may move forward with respect to the gear 27g, and the gear 26g is formed, not moving rearward unless it is released from the mesh with the gear 27g.

A return spring biases the bracket 25 toward the initial position of the headrest main body 30. The return spring is, for example, a torsion spring wound around the pin 27a. The lock plate 27 has a lever-shaped stopper 27c integrally formed with its rear edge. The headrest main body 30 is pushed to the stopper by virtue of the spring force of the return spring as long as it remains at the initial position.

Even if the return spring applies the spring force to the headrest main body 30, the latch 26 provided on the headrest main body is locked to the lock plate 27 provided on the stay because the gears 26g and 27g mesh with each other. The headrest main body 30 (i.e., headrest 20 that is a movable component) is therefore locked at the initial position, rotated forward by 0° with respect to the stay 22 (i.e., stationary component), as seen from FIG. 2A-1.

If pushed forward or pulled rearward, the headrest main body 30 is unlocked and can be rotated forward around the middle part 22b of the stay.

That is, if the headrest main body 30 is pushed forward or pulled rearward at the initial position (rotated forward by 0°), the bracket 25 secured to the headrest main body rotates counterclockwise around the pin 27a.

As the bracket 25 rotates counterclockwise around the pin 27a, the latch 26 provided on the bracket rotates counterclockwise around the pin 25a as indicated by the arrow, to release the gear 26g of the latch from the gear 27g of the lock plate. The gear 26g and the gear 27g are thereby released from each other. The headrest main body 30 can therefore be rotated forward.

The torsion spring wound around the pin 25a applies a bias to the latch 26 to rotate the latch clockwise around the pin 25a. Hence, the force of the torsion spring rotates the latch 26 clockwise as indicated by the arrow in FIG. 3C when the tooth of the latch gear 26g moves over one tooth of the lock plate gear 27g. As a result, the gear 26g meshes with the gear 27g again. More precisely, as shown in FIG. 4B, the teeth 1, 2 and 3 of the latch gear 26g (i.e., first, second and third teeth from the right) mesh the teeth 1', 2' and 3' of the lock plate gear 27g (i.e., first, second and third teeth from the right), respectively. The headrest main body 30 is thereby rotated forward by 7° and locked at the first intermediate rotated position.

When the headrest main body 30 is further rotated forward, the teeth 1, 2 and 3 of the latch gear 26g mesh the teeth 2', 3' and 4' of the lock plate gear 27g, respectively, as shown in FIG. 4C. The headrest main body is thereby rotated forward by 14° in total and locked at the second intermediate rotated position.

When the headrest main body 30 is still further rotated forward, the teeth 1, 2 and 3 of the latch gear 26g mesh the teeth 3', 4' and 5' of the lock plate gear 27g, respectively, as shown in FIG. 4D. The headrest main body is thereby rotated forward by 21° in total and locked at the maximum rotated position.

Thus, the headrest main body 30 is locked, first at the initial position where it is rotated forward by 0°, then at the position where it is rotated forward by 7°, next at the position where it is rotated forward by 14°, and finally at the position where it is rotated forward by 21°. Instead, the headrest main body 30 may be rotated forward immediately from the initial position to the position where it is rotated forward by 14° or 21° and then be locked.

A button 30a for unlocking the headrest main body 30 is provided on one side wall of the headrest main body. If the button 30a is pushed, the latch 26 rotates counterclockwise around the pin 25a against the spring force of the torsion spring wound around the pin 25a. The gear 26g of the latch and the gear 27g of the lock plate are released from mutual mesh. That is, the lock mechanism 24 no longer locks the headrest main body 30. Hence, the bracket 25 rotates clockwise around the pin 27a until it abuts on the stopper 27c, by virtue of the spring force of the return spring wound around the pin 27a, and the headrest main body is rotated backward. Then, whichever forward rotated position it takes, the headrest main body 30 immediately returns to the initial position and is locked because the teeth 2 and 3 of the latch gear 26g mesh with the teeth 1' and 2' of the lock plate gear 27g (see FIG. 2A-1 and FIG. 4A).

The configuration of disengaging the gear 26g and 27g from each other is not a gist of this invention, and will not be described in detail. For example, a pin 26a protrudes from one side of the latch 25 as shown in FIG. 3A. If the motion of the button 30a pushed, in the left-right direction, is converted to an up-down motion, pushing up the pin 26a, the latch 26 is rotated counterclockwise around the pin 25a, disengaging the gear 26g and the gear 27g from each other.

The configuration of converting the motion of the button 30a pushed in the left-right direction to an up-down motion is known in the art. For example, the free end of the pin 26a may have an inclining surface, and the distal end of the button may push the inclining surface of the pin 26a, thereby to push up the pin until the gears 26g and 27g are disengaged from each other.

Needless to say, the lock mechanism 24 is not limited to the configuration specified above, so long as it can lock the headrest main body 30 rotated forward, at a prescribed position.

As shown in FIG. 2A-2 and FIG. 2B-2, a pair of elongated holes 34 extending in the front-rear direction and spaced apart in the left-right direction are made in the bottom surface of the headrest main body 30. The legs 22a of the stay extend in the up-down direction, through the left and right elongated holes, respectively. Therefore, the headrest main body (movable component) 30 can rotate until the front and rear ends of each elongated hole 34 abut on the legs 22a of the stay (non-movable component). In the embodiment, the headrest main body can be rotated forward by 21° at most, as described above.

The headrest main body 30 can rotate in the front-rear direction so long as the front or rear ends of the elongated holes 34 abut on the legs 22a of the stay. However, the range of the angle by which the headrest main body can be rotated forward (that is, from the initial position (rotated forward by 0°) to the maximum rotated position (rotated forward by 21°)) is determined by the lock mechanism 24 that locks the headrest main body. That is, as in most cases, the initial position of the headrest main body precedes the position where the rear ends of the elongated holes 34 abut on the legs 22a of the stay, respectively, and the maximum rotated position is a position adjacent to where the front ends of the elongated holes 34 abut on the legs 22a of the stay, respectively.

A pair of closing members 36 are arranged on the bottom surface of the headrest main body 30 and spaced apart in the left-right direction. The closing members 36 can move (slide) on the bottom surface of the headrest main body in the front-rear direction, closing (covering) the elongated holes 34, respectively. As the headrest main body 30 is rotated, the closing members 36 move (slide) on the bottom surface of the headrest main body along the left and right elongated holes 34, respectively. The closing members 36 therefore close (cover) the elongated holes 34 whichever rotated position the headrest main body takes. That is, the closing members 36 close the elongated holes 34 when the headrest main body is at the initial position or at any rotated position. Hence, the elongated holes 34 remain closed, providing no gaps (no spaces).

In the embodiment, the headrest main body 30 is open at the lower surface, and an under-cover 38 is attached, from below, to the opening lower surface of the headrest main body, and defines the bottom surface of the headrest main body. The elongated holes 34 spaced in the left-right direction are prepared on the under-cover 38. The left and right closing members 36 are made in the under-cover to cover the elongated holes 34, and can move (slide) along the elongated holes 34 in the front-rear direction. The under-cover 38 and the closing members 36 are made of, for example, synthetic resin, preferably thermoplastic synthetic resin such as polypropylene, and are shaped like a plate. As in most cases, the under-cover is shaped symmetric in the left-right direction and the left and right closing members have the same shape. Instead, the under-cover may be asymmetric in the left-right direction and the left and right closing members may have different shapes.

Figure 5A:
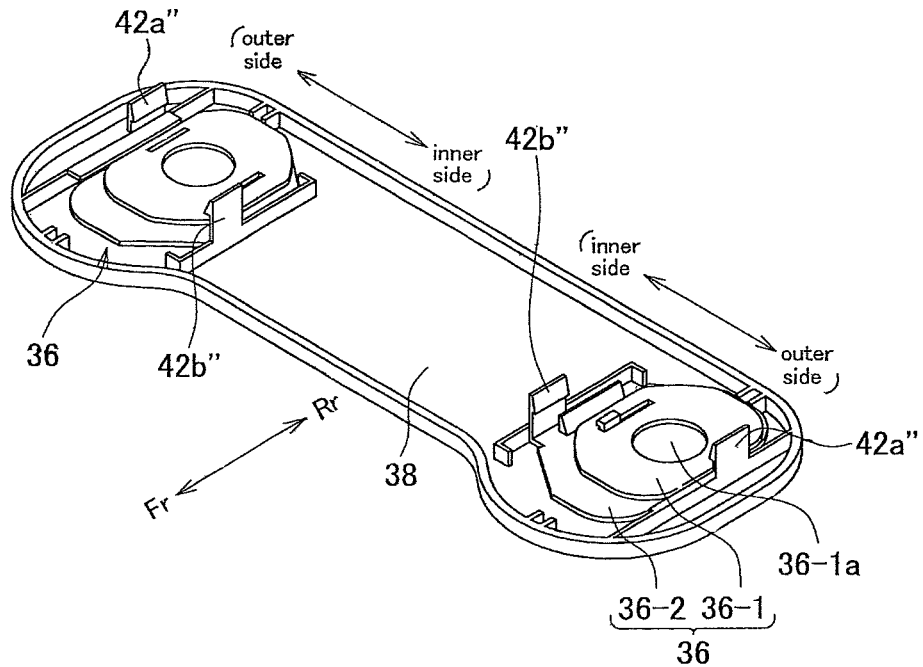
FIG. 5A is a perspective view, showing the under-cover and the closing members.
Figure 5B:
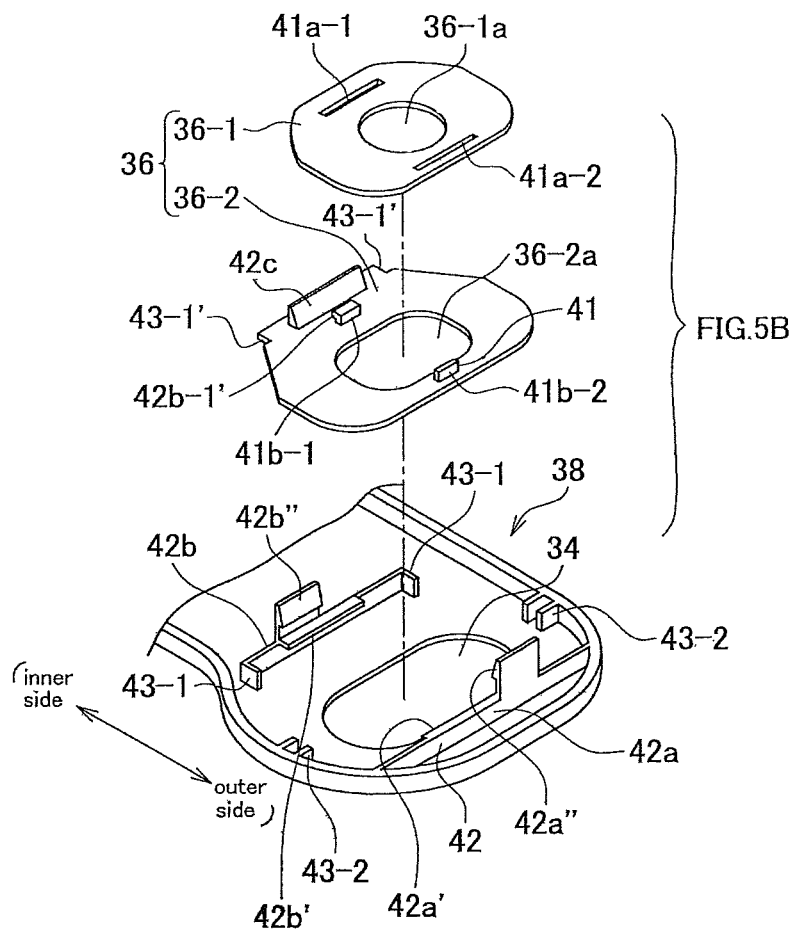
FIG. 5B is an exploded, perspective view of the under-cover and the closing member in the right half of the under-cover.

FIG. 5A is a perspective view, showing the under-cover and the closing members and FIG. 5B is an exploded, perspective view of the under-cover and the closing member in the right half of the under-cover.

As shown in FIG. 5A and FIG. 5B, the closing members 36 are shaped like a plate. Each closing member 36 is composed of, for example, a main plate 36-1 and a sub-plate 36-2. The main plate 36-1 is positioned above the sub-plate 36-2, and the sub-plate is positioned on the under-cover 38 (i.e., bottom surface of the headrest main body 30). Namely, the sub-plate is positioned between the main plate and the under-cover 38, and the main plate is positioned on the sub-plate. The main plate and the sub-plate can move together in the front-rear direction.

Figures 1, 6A:
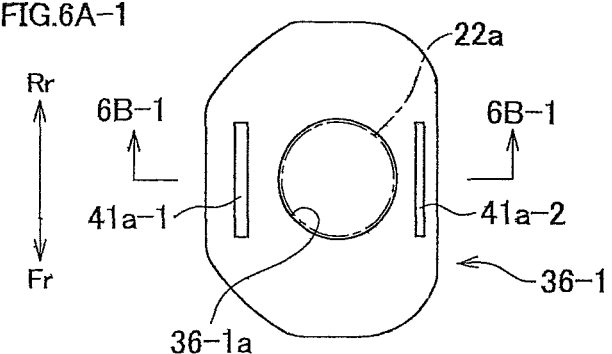
Figures 1, 6B:
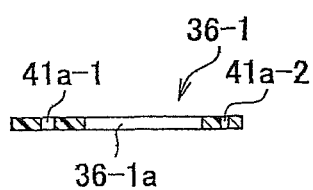
Figures 2, 6A:
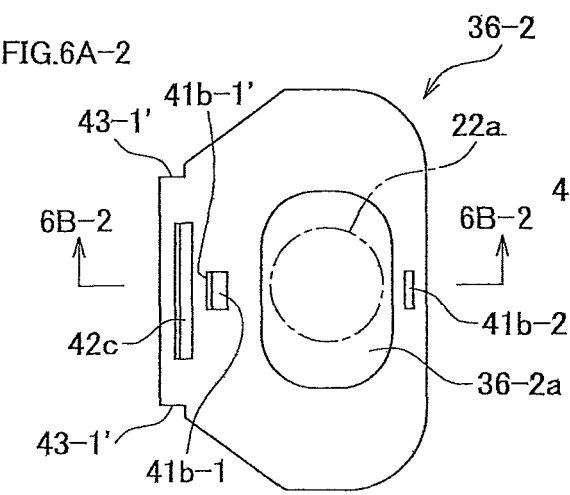
Figures 2, 6B:
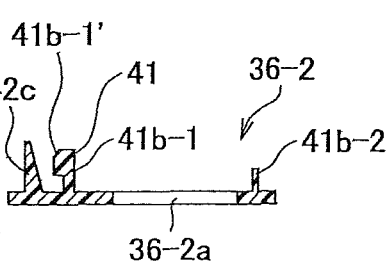
Figures 3, 6A:
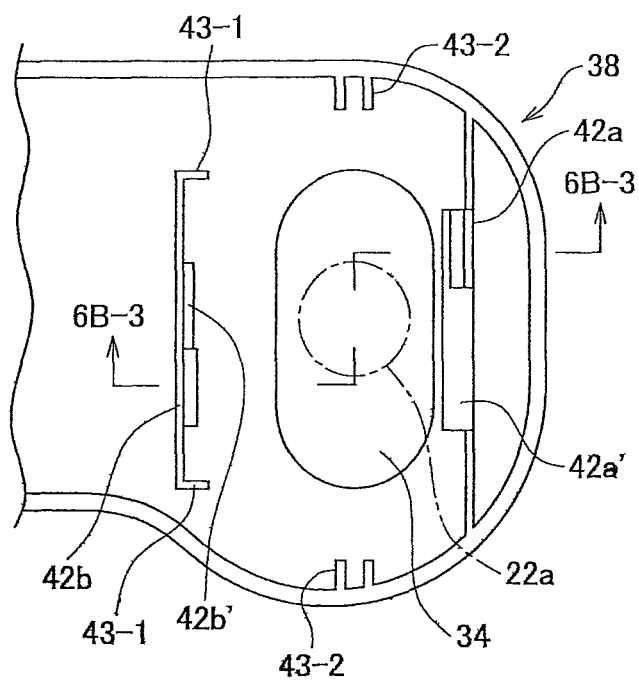
Figures 3, 6B:
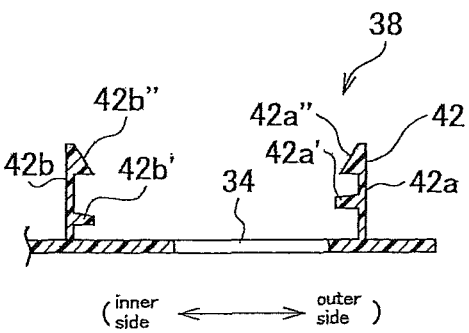

FIG. 6A-1 is a plan view of the main plate; FIG. 6A-2 is a plan view of the sub-plate; FIG. 6A-3 is a plan view of the right half of the under-cover; FIG. 6B-1 is a sectional view of the main plate, taken along line 6B-1-6B-1 shown in FIG. 6A-1; FIG. 6B-2 is a sectional view of the sub-plate, taken along line 6B-2-6B-2 shown in FIG. 6A-2, and FIG. 6B-3 is a sectional view of the under-cover, taken along line 6B-3-6B-3 shown in FIG. 6A-3.

As shown in FIGS. 6A-1 to 6A-3 and FIGS. 6B-1 to 6B-3, an insertion hole 36-1a is made in the main plate 36-1, and an elongated hole (auxiliary elongated hole) 36-2a is made in the sub-plate 36-2. Each leg 22a of the stay extends, with a little clearance, through the insertion hole 36-1a and extends, with a sufficient clearance, through the elongated hole 36-2a, respectively. The elongated hole 36-2a is a rectangular hole extending in the front-rear direction and has four curved corners. Its width and length (measured in the front-rear direction) are smaller than those of the elongated hole 34 made in the under-cover 38. The width and length (measured in the front-rear direction) of the elongated hole 36-2a are, for example, about 60% of the width and length (measured in the front-rear direction) of the elongated hole 34.

The main plate 36-1 is guided and restricted in motion on the sub-plate 36-2, by a main restricting means 41. The sub-plate 36-2 is guided and restricted in motion on the under-cover 38, by a sub-restricting means 42.

The main restricting means 41 is provided between the main plate 36-1 and the sub-plate 36-2. The sub-restricting means 42 is provided between the sub-plate 36-2 and the under-cover 38.

The main restricting means 41 has two restricting slits 41a-1 and 41a-2 on the left and right sides of the insertion hole 36-1a, respectively, and two restricting projections 41b-1 and 41b-2 on the right and left sides of the elongated hole 36-2a, respectively. More precisely, two restricting slits 41a-1 and 41a-2, each shaped like an elongated hole extending in the front and rear direction, are cut in the main plate 36-1 and located across the insertion hole 36-1a. Two restricting projections 41b-1 and 41b-2 extending in the front and rear direction, located across the elongated hole 36-2a protrude from the sub-plate 36-2, are located across the elongated hole 36-2a and loosely fitted in the restricting slits 41a-1 and 41a-2, respectively.

Since the restricting projections 41b-1 and 41b-2 are loosely fitted in the restricting slits 41a-1 and 41a-2 cut in the main plate 36-1, each shaped like an elongated hole, the main plate 36-1 moves (slides) on the sub-plate 36-2 until the front or rear ends of the restricting slits abut on the restricting projections.

As in most cases, the restricting slits 41a-1 and 41a-2 are positioned symmetrical in the left-right direction, and so are the restricting projections 41b-1 and 41b-2. That is, the restricting slits 41a-1 and 41a-2 have the same length and are provide at the same position in the front-rear direction, and the restricting projections 41b-1 and 41b-2 also have the same length and provided at the same position in the front-rear direction. Therefore, the front and rear ends of the left restricting slit 41a-1 and the front and rear ends of the right restricting slit 41a-2 abut on the restricting projections 41b-1 and 41b-2, respectively, at the same time. Hence, the main plate 36-1 is smoothly guided and moved on the sub-plate 36-2 without vibrating.

As shown in FIG. 6B-2, a hook 41b-1' is formed at the distal end of the restricting projection 41b-1, and projects inwards (to the left in FIG. 6B-2.

In the embodiment, the main restricting means 41 is so configured that the left and right restricting slits 41a-1 and 41a-2 simultaneously abut, at front or rear end, respectively on the left and right restricting projections 41b-1 and 41b-2, thereby restricting and guiding the motion of the main plate 36-1 on the sub-plate 36-2. The main restricting means 41 is not limited to this configuration, nevertheless. For example, one of the left and right restricting slits 41a-1 and 41a-2 may abut, at the front or rear end, on the restricting projection 41b-1 or 41b-2, to restrict and guide the motion of the main plate 36-1. Alternatively, one of restricting slits 41a-1 and 41a-2 may abut, at front end, on the restricting projection 41b-1, and the other restricting slit may abut, at the rear end, on the restricting projection 41b-2, thereby to restrict and guide the motion of the main plate.

The sub-restricting means 42 has a pair of side walls 42a and 42b standing upright on the under-cover 38 and opposing the left and right sides of the sub-plate 36-2, respectively, and extending in the front-rear direction, in parallel to the elongated hole 34. The side walls 42a and 42b have eaves 42a' and 42b', each covering a part of the sub-plate 36-2 and extending toward the elongated hole 34. The eaves 42a' of the outer side wall 42a is spaced from the upper surface of the under-cover 38 by such a distance that it may cover not only the sub-plate 36-2, but also the main plate 36-1 (see FIG. 6B-3).

The sub-restricting means 42 further has a wall 42c. The wall 42c is positioned between the restricting projection 41b-1 and the inner side of the sub-plate 36-2, protrudes from the sub-plate opposes the side wall 42a and extends in the front-rear direction (see FIGS. 6A-2 and 6B-2).

The words "inner," "outer," "left" and "right" are used herein to distinguish similar members from one another, and not intended to specify the positions of the similar members.

Hooks 42a" and 42b" are formed, respectively at the distal ends of the side walls 42a and 42b provided on the under-cover 38, and oppose each other across the elongated hole 34. As shown in FIG. 5A, two sets of hooks 42a" and 42b" are provided on the left and right halves of the under-cover.

The hooks 42a" and 42b" of each set are used, fastening the under-cover 38 to the lower surface of the headrest main body 30. The headrest main body has, for example, engagement holes. The hooks 42a" and 42b" are engaged in the engagement holes, whereby the under-cover is fastened to the lower surface of the headrest main body.

The front and rear edges of the inner side wall 42b of the under-cover 38 are bent at right angles to the elongated hole 34, forming a pair of bent strips. The bent strips, which are spaced in the front-rear direction, constitute a pair of stoppers 43-1 for limiting the distance the sub-plate 36-2 moves on the under-cover. The front and rear ends of the left edge of the sub-plate 36-2, which opposes the side wall 42b, are shaped like a shoulder and are used as abutting edges 43-1' that may abut on the stoppers 43-1. Two pairs of ribs spaced from each other in the front-rear direction and extending in the front-rear direction are formed integral with the circumferential wall of the under-cover 38, and are used as stoppers 43-2 for limiting the distance the sub-plate 36-2 moves on the under-cover.

The closing member 36 including the main plate 36-1 and sub-plate 36-2 is incorporated in the under-cover 38, as will be described below.

First, the sub-plate 36-2 is slide sideways, locating the restricting slit 41a-1 below the hook 41b-1' of the restricting projection 41b-1. Then, the main plate 36-1 is laid on the sub-plate 36-2, inserting the restricting projection 41b-2 on the other side into the restricting slit 41a-2. The main plate is thereby incorporated in the sub-plate.

Then, the main plate 36-1 and sub-plate 36-2 are slid sideways to a position below the eaves 42a' of the side wall 42a of the under-cover. Further, the sub-plate is pushed, while covering the eaves 42b' of the side wall 42b. As a result, the eaves 42b' is resiliently deformed, and the sub-plate enters the space below the eaves 42b'. Thus, the main plate and the sub-plate are incorporated in the under-cover 38.

The method of incorporating the main plate 36-1 and sub-plate 36-2 into the under-cover 38, explained above, is no more than an example. The method is not limited the one explained above.

When the main plate 36-1 and sub-plate 36-2 are incorporated into the under-cover 38 as explained above, the restricting projection 41b-1 of the sub-plate 36-2 enters the restricting slit 41a-1 of the main plate 36-1, and the hook 41b-1' of the restricting projection 41b-1 is engaged in the restricting slit 41a-1. Further, the main plate 36-1 lies below the eaves 42a' of the under-cover, together with the sub-plate 36-2. The main plate is therefore covered, at the left and right parts, with the hooks 41b-1' of the restricting projections of the sub-plate and the eaves 42a' of the under-cover, and the hooks 41b-1' of the restricting projections are engaged in the restricting slit 41a-1. This prevents the main plate 36-1 from moving up, and hence from being detached from the sub-plate 36-2.

The sub-plate 36-2 slips, along with the main plate 36-1, into a space below the eaves 42a' of the side wall 42a of the under-cover. Further, the sub-plate slips into a space below the eaves 42b' of the side wall 42b opposing the side wall 42a. Therefore, the sub-plate is covered, at left and right parts, with the eaves 42a' and 42b' of the under-cover, and is prevented from moving up, and hence from being detached from the under-cover 38.

As specified above, the main restricting means 41 and the sub-restricting means 42 not only restrict the motion of the main plate 36-1 and sub-plate 36-2 and guide the main plate and sub-plate, but also prevent the main plate and sub-plate from being detached from the under-cover 38. Since the main plate 36-1 is incorporated in the sub-plate 36-2 and the sub-plate is incorporated in the under-cover 38 together with the main plate, the main plate and sub-plate are incorporated in the under-cover, never removed from the under-cover. Thus, the under-cover 38 constitutes a unit incorporating the main plate and sub-plate. The under-cover can be quickly and easily attached, by a single action, to the headrest main body 30 as the hooks 42a" provided on the side wall are engaged in the engagement holes made in the headrest main body.

How the closing member 36, more precisely the main plate 36-1 and sub-plate 36-2, moves in the front-rear direction will be explained below.

In this invention, the main plate 36-1 moves alone on the sub-plate 36-2 in the front-rear direction in the initial phase of rotating the headrest 20 forward. After moving for a prescribed distance, the main plate 36-1 moves on the under-cover 38, together with the sub-plate 36-2.

Figure 7A:
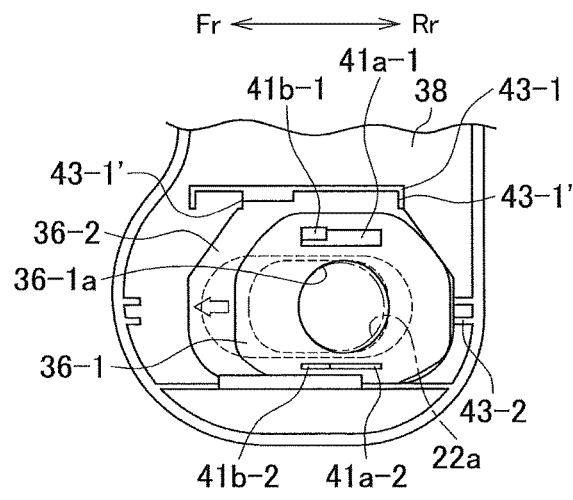
FIG. 7A is a plan view showing the under-cover, main plate and sub-plate assume while the headrest main body remains at the initial position (rotated forward by 0°)
Figure 7B:
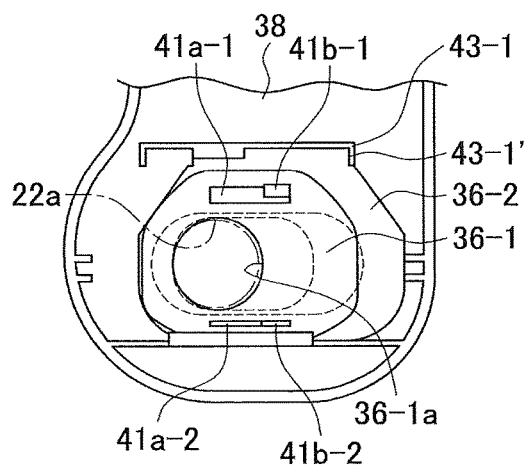
FIG. 7B is a plan view showing the under-cover, main plate and sub-plate assume while the headrest main body remains at the first intermediate rotated position (rotated forward by 7°)
Figure 7D:
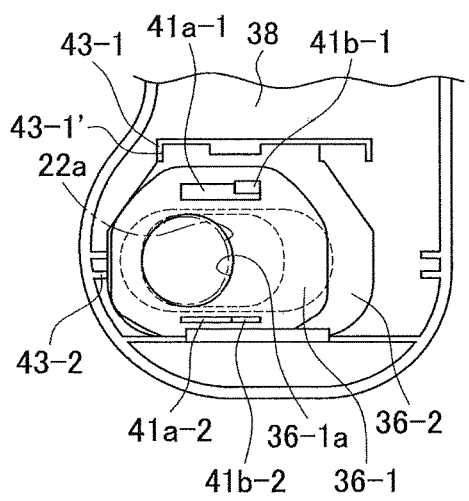
FIG. 7D is a plan view showing the under-cover, main plate and sub-plate assume while the headrest main body remains at the maximum rotated position (rotated forward by 21°)
Figure 7C:
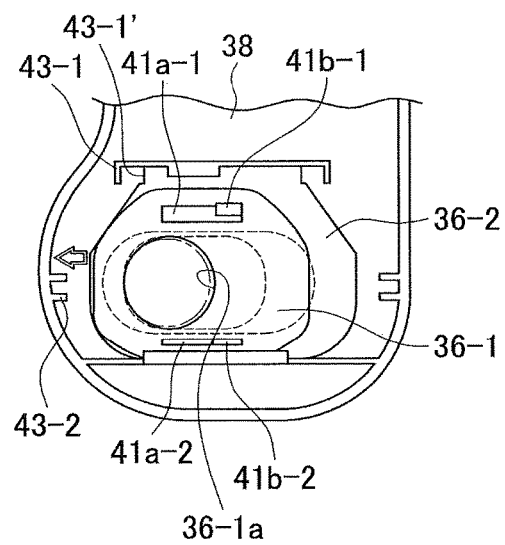
FIG. 7C is a plan view showing the under-cover, main plate and sub-plate assume while the headrest main body remains at the second intermediate rotated position (rotated forward by 14°)
Figure 8A:
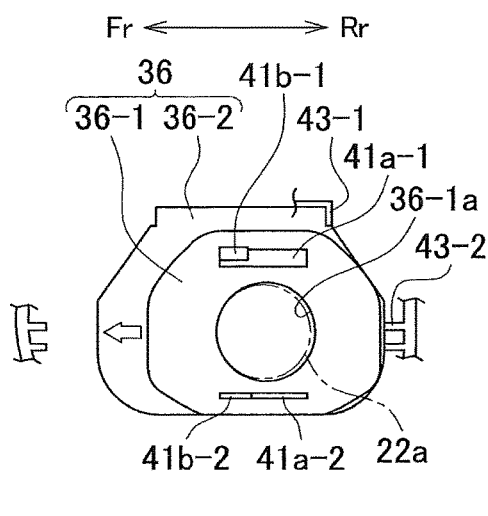
FIG. 8A is a plan view of the main plate and sub-plate, not illustrating the under-cover shown in FIG. 7A.
Figure 8B:
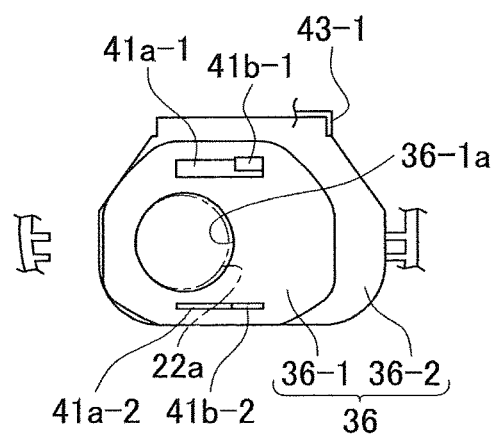
FIG. 8B is a plan view of the main plate and sub-plate, not illustrating the under-cover shown in FIG. 7B.
Figure 8D:
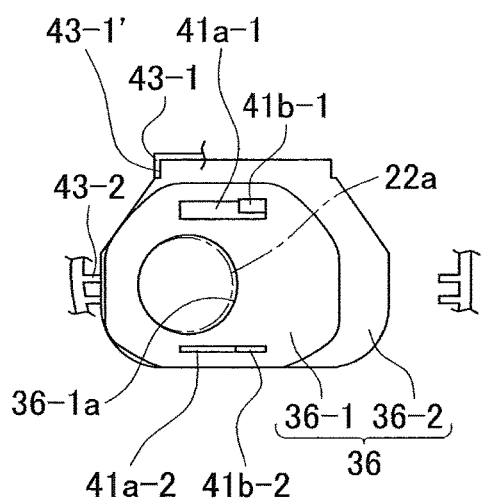
FIG. 8D is a plan view of the main plate and sub-plate, not illustrating the under-cover shown in FIG. 7D.
Figure 8C:
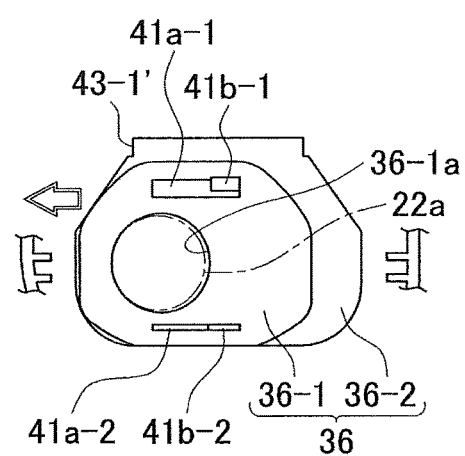
FIG. 8C is a plan view of the main plate and sub-plate, not illustrating the under-cover shown in FIG. 7C.

FIG. 7A is a plan view showing the under-cover, main plate and sub-plate assume while the headrest main body remains at the initial position (rotated forward by 0°); FIG. 7B is a plan view showing the under-cover, main plate and sub-plate assume while the headrest main body remains at the first intermediate rotated position (rotated forward by 7°); FIG. 7C is a plan view showing the under-cover, main plate and sub-plate assume while the headrest main body remains at the second intermediate rotated position (rotated forward by 14°); FIG. 7D is a plan view showing the under-cover, main plate and sub-plate assume while the headrest main body remains at the maximum rotated position (rotated forward by 21°); FIG. 8A is a plan view of the main plate and sub-plate, not illustrating the under-cover shown in FIG. 7A; FIG. 8B is a plan view of the main plate and sub-plate, not illustrating the under-cover shown in FIG. 7B; FIG. 8C is a plan view of the main plate and sub-plate, not illustrating the under-cover shown in FIG. 7C; FIG. 8D is a plan view of the main plate and sub-plate, not illustrating the under-cover shown in FIG. 7D; FIG. 9A is a partly sectional, vertical view of the headrest main body set in the initial position (rotated forward by 0°); FIG. 9B is a partly sectional, vertical view corresponding to FIG. 7B, showing the headrest main body set in the first intermediate rotated position (rotated forward by 7°); and FIG. 9C is a partly sectional, vertical view of the headrest main body set in the maximum rotated position (rotated forward by 21°).

In the initial position, the headrest main body 30 is rotated forward by 0°, standing almost upright, as shown in FIG. 2A-1 and FIG. 9A.

While the headrest main body 30 remains in the initial position, the insertion hole 36-1a of the main plate is almost concentric with the associated leg 22a of the stay as shown in FIG. 7A, FIG. 8A and FIG. 9A. The front end of the insertion hole does not abut on the leg of the stay.

The main plate 36-1 is at the most retreated position (rearmost position) on the sub-plate 36-2, where the front ends of the restricting slits 41a-1 and 41a-2 of the main plate abut on the restricting projections 41b-1 and 41b-2 of the sub-plate, respectively.

The sub-plate 36-2 is at the most retreated position (rearmost position) where the rear abutting edge 43-1' of the side edge, abuts on the rear stopper (bent strip) 43-1 of the side wall 42b of the under-cover and the rear end of the sub-plate abuts on the rear stopper (rib) 43-2 of the under-cover.

The position (rearmost position) where the main plate 36-1 is most retreated on the under-cover 38 corresponds to the initial position of the main plate. The position (rearmost position) where the sub-plate 36-2 is most retreated on the under-cover corresponds to the initial position of the sub-plate.

If the headrest main body 30 is rotated forward around the middle part 22b of the stay, the front end of the insertion hole 36-1a of the main plate immediately abuts on the leg 22a of the stay as shown in FIG. 9B. As a result, the leg 22a of the stay interferes with the main plate, as indicated in FIG. 9B. The gear-shaped balloon accentuates the interference.

As the headrest main body 30 is further rotated forward, the front end of the insertion hole 36-1a is pressed onto the leg 22a of the stay. As the front end of the insertion hole 36-1a is pressed onto the leg 22a of the stay, the main plate 36-1 causes the restricting projections 41b-1 and 41b-2 protruding from the sub-plate to slide in the restricting slits 41a-1 and 41a-2. That is, the main plate 36-1 moves forward on the sub-plate as the main plate is guided and restricted by the restricting slits and the restricting projections. In other words, the main plate 36-1 moves forward above the under-cover 38, and on the sub-plate 36-2 interposed between the main plate and the under-cover.

The main plate 36-1 keeps moving on the sub-plate 36-2 until the rear ends of the restricting slits 41a-1 and 41a-2 abut on the restricting projections 41b-1 and 41b-2, respectively.

As the headrest main body 30 is further rotated forward after the rear ends of the restricting slits 41a-1 and 41a-2 abut on the restricting projections 41b-1 and 41b-2, the front end of the insertion hole 36-1a is pressed onto the leg 22a of the stay, causing the main plate 36-1 to move forward further. The main plate 36-1 is inhibited from moving forward because the rear ends of the restricting slits 41a-1 and 41a-2 abut on the restricting projections 41b-1 and 41b-2, respectively. As FIG. 7C and FIG. 8C show, the main plate therefore moves forward on the under-cover, together with the sub-plate 36-2, while the pushing the rear ends of the restricting slits 41a-1 and 41a-2 onto the restricting projections 41b-1 and 41b-2, respectively.

That is, only the main plate 36-1 moves on the sub-plate and above the under-cover until the rear ends of the restricting slits 41a-1 and 41a-2 abut on the restricting projections 41b-1 and 41b-2, respectively (see FIGS. 7A and 7B and FIGS. 8A and 8B). After the rear ends of the restricting slits 41a-1 and 41a-2 abut, respectively, on the restricting projections 41b-1 and 41b-2, the main plate 36-1 moves on the under-cover 38, together with the sub-plate 36-2. Thus, the main plate and the sub-plate move together on the under-cover 38 (see FIG. 7C and FIG. 8C).

The main plate 36-1 keeps moving together with the sub-plate 36-2 until the front abutting edge 43-1' of the side edge of the sub-plate abuts on the front stopper (bent strip) 43-1 of the side wall 42b of the under-cover and the front edge of the sub-plate abuts on the front stopper (rib) 43-2 of the under-cover (see FIG. 7D and FIG. 8D). When the front abutting edge 43-1' of the side edge of the sub-plate abuts on the front stopper (bent strip) 43-1 of the side wall 42b of the under-cover and the front edge of the sub-plate abuts on the front stopper (rib) 43-2 of the under-cover, the headrest main body 30 reaches the maximum rotated position, where it is rotated forward by 21° (see FIG. 2B-1).

In the embodiment, two stoppers, i.e., stopper 43-1 composed of a pair of bent strips and stopper 43-2 composed of a pair of ribs, restrict the motion of the sub-plate 36-2 and main plate 36-1 on the under-cover. The configuration for restricting the motion of the sub-plate and main plate on the under-cover is not limited to this, nevertheless. For example, either the stopper 43-1 (composed of bent strips) or the stopper 43 (composed of ribs) may restrict the motion of the sub-plate 36-2 (and the main plate 36-1).

The front stopper is not limited to one composed of bent strips. Nor is the rear stopper limited to one composed of ribs. The stoppers may be of any type that can restrict the motion of the sub-plate 36-2 (and the main plate 36-1). For example, a pair of pins may protrude from the under-cover 38, spaced apart in the front-rear direction.

As described above, the main plate 36-1 moves alone on the sub-plate from the initial position shown in FIG. 7A and FIG. 8A to the position shown in FIG. 7B and FIG. 8B. The main plate 36-1 then moves from the position shown in FIGS. 7B and 8B to the position shown in FIGS. 7C and 8C, and thence to the position shown in FIGS. 7D and 8D, together with the sub-plate 36-2 (on the under-cover 38).

The elongated hole 34 of the under-cover 38 is closed by the associated closing member (main plate 36-1 or sub-plate 36-2) while the headrest main body 30 (or headrest 20) remains at the initial position (rotated forward by 0°), any rotated forward position (rotated forward by 7° or 14°), or maximum rotated position (rotated forward by 21°).

More precisely, as shown in FIG. 9A, the elongated hole 34 of the under-cover is closed by the sub-plate 36-2 and the elongated hole 36-2a of the sub-plate is closed by the main plate 36-1 while the headrest main body 30 remains at the initial position. The gap between the leg 22a of the stay and the circumference of the insertion hole 36-1a of the main plate through which the leg of the stay extends is very small. The elongated hole 34 of the under-cover can therefore be covered with the main plate and sub-plate. Thus, the main plate and the sub-plate cooperate, closing the elongated hole 34 of the under-cover.

As described above, if the headrest main body 30 (or headrest 20) is rotated forward from the initial position (rotated forward by 0°), the main plate 36-1 moves alone on the sub-plate from the position shown in FIGS. 7A and 8A to the position shown in FIGS. 7B and 8B. While the main plate 36-1 is so moving, the sub-plate 36-2 does not move. Therefore, the elongated hole 34 of the under-cover remains closed by the sub-plate 36-2 (see FIG. 9A).

As seen from FIGS. 9A and 9B, the main plate 36-1 moves on the sub-plate 36-2, closing (covering) the elongated hole 36-2a of the sub-plate. The main plate and the sub-plate therefore cooperate, closing the elongated hole 34 of the under-cover 38 while only the main plate is moving.

Moreover, the sub-plate 36-2 moves, while closing the elongated hole 34 of the under-cover, even if the main plate 36-1 moves, together with the sub-plate, on the under-cover 38 in the front-rear direction. Further, the sub-plate is so shaped that it abuts on the stoppers 43-1 and 43-2 provided on the under-cover and closes the elongated hole 34 of the under-cover even if the headrest main body 30 assumes the maximum rotated position (rotated forward by 21°, see FIG. 9C). In other words, the main plate and the sub-plate cooperate, closing the elongated hole 34 of the under-cover, while moving together until the headrest main body 30 is rotated toward the maximum rotated position and even when the headrest main body reaches the maximum rotated position.

As the main plate 36-1 moves alone or together with the sub-plate 36-2 on the under-cover 38, the headrest main body 30 (namely, headrest 20) is locked by the lock mechanism, first rotated forward by 7°, then rotated forward by 14° and finally rotated forward by 21°. No matter at whichever position the headrest main body 30 is locked, rotated forward by 7°, 14° or 21°, it is unlocked if the button 30a provided on one side of the headrest main body is pushed, and returns to the initial position (rotated forward by 0°) by virtue of the force of the return spring.

The closing member 36 is composed of two plates (i.e., main plate 36-1 and sub-plate 36-2) that can move in unison. The closing member that closes the elongated hole 34 made in the bottom surface of the headrest main body is therefore simple in configuration.

In addition, the sub-plate 36-2 closes the elongated hole 34 made in the bottom surface of the headrest main body, the main plate 36-1 closes the elongated hole (auxiliary elongated hole) 36-2a of the sub-plate, and the sub-plate does not move in the initial phase of rotating the headrest 20 forward. The distance the closing member 36 moves can be shorter than in the conventional configuration in which only the member equivalent to the sub-plate moves while closing the elongated hole made in the bottom surface of the headrest main body. Hence, the headrest main body 30, and ultimately the headrest 20 can be made shorter in the front-rear direction.

Both the main plate 36-1 and the sub-plate 36-2, which constitute the closing member 36, move in the front-rear direction without rotating. Therefore, spaces in which the main plate and the sub-plate may rotate need not be provided in the direction (left-right direction) intersecting at right angles to the elongated hole 34 made in the bottom surface (i.e., under-cover 38) of the headrest main body 30. Hence, the arrangement of members is not limited in the direction intersecting at right angles to the elongated hole 34, and the freedom of design is not restricted.

The closing member 36 is composed of the main plate 36-1 and the sub-plate 36-2 that moves as the headrest main plate 30 rotates forward. Both the main plate 36-1 and the sub-plate 36-2 move, closing the elongated hole 34 made in the bottom surface of the headrest main body. That is, the sub-plate 36-2 closes that part of the elongated hole 34, which the main plate 36-1 cannot close. In this configuration, the main plate and the sub-plate cooperate, reliably closing the elongated hole 34 made in the bottom surface of the headrest main body. The closing member 36 can therefore be miniaturized, requiring but a small space around the elongated hole 34. This increases the freedom of design.

The main plate 36-1 and the sub-plate 36-2 cooperate, always closing the elongated hole 34 of the under-cover or the elongated hole made in the bottom surface of the headrest main body, whether the headrest main body 30 takes the initial position and not rotated forward, whether the main plate moves alone or together with the sub-plate, or whether the headrest main body remains at the maximum rotated position. Therefore, no gaps (spaces) are made in the elongated hole 34 of the under-cover. Hence, the occupant never has his fingers pinched in the elongated hole 34.

Since the elongated hole 34 of the under-cover is kept closed by the main plate 36-1 and sub-plate 36-2, the interior of the headrest 20 is not seen through the elongated hole. This preserves the outer appearance of the headrest.

Since the trim cover has no grooves in the upper front part of the seatback, the scarf or jacket the occupant wears would not be taken into the elongated holes 34 of the under-cover through such grooves. Having no grooves, the trim cover is not degraded in outer appearance.

The under-cover 38 is attached to the headrest main body 30 from below, defining the bottom surface of the headrest main body. The main restricting means 41 and the sub-restricting means 42 not only guide the main plate 36-1 and sub-plate 36-2 and restrict their motion in the front-rear direction, but also hold the main plate and sub-plate on the under-cover 38, preventing them from removed from the under-cover. Thus, the closing member 36 composed of the main plate 36-1 and the sub-plate 36-2 is incorporated in the under-cover 38 defining the bottom surface of the headrest main body. The under-cover 38 is therefore a unit that incorporates the closing member 36. Hence, the under-cover can be quickly and easily attached to the headrest main body 30.

As has been described, the closing member does not rotate, and no space for allowing the closing member to rotate need be provided in the bottom surface of the headrest main body, in the direction intersecting at right angles to the elongated hole made in the bottom surface of the headrest main body. Therefore, the arrangement of members is not limited in the direction intersecting at right angles to the elongated hole, and the freedom of design is not restricted.

Since the closing member closes the elongated hole made in the bottom surface of the headrest main body, the occupant never has his fingers pinched in the elongated hole. For the same reason, the scarf or jacket the occupant wears would not be taken into the elongated hole.

The embodiment has been described to explain this invention, and is not intended to limit the scope of the invention. Accordingly, various changes and modifications may be made within the spirit or scope of this invention, and are of course included in this invention.

INDUSTRIAL APPLICABILITY

This invention is applied to the headrest of the vehicle seat for use in buses, trains, cars and aircraft. Its use is not limited to the vehicle seat, nevertheless. The invention can be applied also to the headrest of the seat for use in offices, public halls, theaters, movie houses, sport facility, and to the headrest of the seat for used in households.

REFERENCE MARKS IN THE DRAWINGS 10 seat (vehicle seat)
12 seat cushion
14 seatback
20 headrest
22 stay
22a legs
22b middle part
30 headrest main body
34 elongated holes (elongated holes made in the bottom surface of the headrest main body)
36 clothing members
36-1 main plates
36-1a insertion holes
36-2 sub-plates
36-2a elongated holes (auxiliary elongated holes)
41 main restricting means
41a-1, 41a-2 restricting slits
41b-1, 41b-2 restricting projections
42 sub-restricting means
42a, 42b side walls
42a', 42b' eaves
43-1 stoppers (bent strips)
43-2 stoppers (ribs)

What is claimed is:
1. A headrest comprising:
a stay having left and right legs;
a headrest main body attached to the stay and able to rotate in a front-rear direction;

an under-cover attached to the headrest main body from below, defining a bottom surface of the headrest main body, a pair of elongated holes made in the under-cover of the bottom surface of the headrest main body, extending in the front-rear direction and spaced apart in a left-right direction and guiding the legs of the stay, thereby allowing the under-cover to rotate in the front-rear direction; and a pair of closing members arranged on the under-cover, covering the elongated holes, respectively, and able to move on the under-cover in the front-rear direction, wherein each closing member includes a main plate and a sub-plate, both arranged on the under-cover, with the main plate lying above the sub-plate, the main plate has an insertion hole guiding one leg of the stay and moves in the front-rear direction as the main plate is rotated, and the sub-plate is provided, overlapping the main plate, and is able to move as the main plate moves;

each leg of the stay extends in the up-down direction through not only the elongated hole made in the under-cover, but also the insertion hole of the main plate; and an auxiliary elongated hole is made in the sub-plate, each leg of the stay extends through the auxiliary elongated hole, the main plate and the sub-plate move in the front-rear direction as the headrest main body is rotated, while covering and closing, respectively, the auxiliary elongated hole made in the sub-plate and the elongated hole made in the under-cover, the main plate has restricting slits, the sub-plate has restricting projections protruding from the sub-plate and loosely fitted in the restricting slits, respectively, and the restricting slits and the restricting projections guide the main plate on the sub-plate and restrict a motion of the main plate on the sub-plate.

2. The headrest according to claim 1, wherein the restricting slits are elongated holes extending in the front-rear direction the main plate moves on the sub-plate until rear ends of the restricting slits abut on the restricting projections, respectively; and the main plate moves on the under-cover, together with the sub-plate, after the rear ends of the restricting slits abut on the restricting projections, respectively.

3. The headrest according to claim 2, wherein the restricting slits and the restricting projections not only guide the main plate on the sub-plate and restricts the motion of the main plate on the sub-plate, but also prevent the main plate from moving away from the sub-plate;

a pair of side walls on opposing left and right edges of the sub-plate are provided respectively, protrude from the under-cover and extend in the front-rear direction, to guide the sub-plate on the under-cover and restrict the motion of the sub-plate on the under-cover, and prevent the sub-plate from moving away from the under-cover, as the main plate moves together with the sub-plate;

a pair of stoppers protrude from the under-cover and are spaced apart in the front-rear direction, to restrict the distance the sub-plate moves on the under-cover; and the main plate and the sub-plate are held by the restricting slits, the restricting projections, and the pair of side walls, respectively, and incorporated in the under-cover; and the pair of closing members and the under-cover thereby constitute a unit.

4. The headrest according to claim 3, wherein two sets of restricting slits and two sets of restricting projections are provided at left and right sides of the insertion hole, respectively;

one of the side walls covers a part of the sub-plate, preventing the sub-plate from moving upward from the under-cover; and the other of the side walls covers a part of the main plate and also a part of the sub-plate, and prevents the main plate and sub-plate from moving upward from the under-cover; and hooks are formed at distal ends of the restricting projections and oppose one of the side walls, and prevents the main plate from moving upward from the sub-plate.

5. The headrest according to any one of claims 1 and 2 to 4, to be held at the upper edge of a seatback which is coupled, at lower edge, to a rear edge of a seat cushion arranged in a vehicle.

* * * * *